(12) United States Patent
Iwasaki et al.

(10) Patent No.: US 7,307,967 B2
(45) Date of Patent: Dec. 11, 2007

(54) MOBILE COMMUNICATIONS SYSTEM AND ROUTING MANAGEMENT APPARATUS USED IN THE MOBILE COMMUNICATIONS SYSTEM

(75) Inventors: Atsushi Iwasaki, Yokosuka (JP); Masahiro Sawada, Yokohama (JP); Shinichi Isobe, Yokosuka (JP); Takeshi Ihara, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 587 days.

(21) Appl. No.: 10/749,398

(22) Filed: Jan. 2, 2004

(65) Prior Publication Data

US 2004/0196818 A1    Oct. 7, 2004

(30) Foreign Application Priority Data

Jan. 9, 2003    (JP)    ............................. 2003-003485

(51) Int. Cl.
    *H04Q 7/00*    (2006.01)
(52) U.S. Cl. .................. 370/328; 370/338; 370/401; 370/352; 370/355; 370/371; 370/398; 455/456.1; 455/458
(58) Field of Classification Search ................ 370/328, 370/401, 352, 331, 355, 371, 398, 338, 393; 455/456.1, 458
    See application file for complete search history.

(56) References Cited

U.S. PATENT DOCUMENTS

| | | | |
|---|---|---|---|
| 2002/0009066 A1* | 1/2002 | Shimizu et al. ............. | 370/338 |
| 2002/0012327 A1* | 1/2002 | Okada ......................... | 370/328 |
| 2002/0055971 A1 | 5/2002 | Shahrier | |
| 2003/0148765 A1* | 8/2003 | Ma et al. .................... | 455/438 |
| 2004/0114559 A1* | 6/2004 | Wang .......................... | 370/338 |
| 2004/0185854 A1* | 9/2004 | Artola et al. ............... | 455/445 |
| 2004/0203894 A1* | 10/2004 | Watanabe et al. ......... | 455/456.1 |

FOREIGN PATENT DOCUMENTS

| | | |
|---|---|---|
| EP | 0 963 087 A1 | 12/1999 |
| EP | 1 011 241 A1 | 6/2000 |
| EP | 1 102 509 A1 | 5/2001 |

OTHER PUBLICATIONS

M. Sawada, et al., IEICE Society Conference, 2 pages, "Mobility Management Architecture for IP-Based IMT Network Platform", Sep. 2002.

* cited by examiner

*Primary Examiner*—William Trost
*Assistant Examiner*—Julio Perez
(74) *Attorney, Agent, or Firm*—Oblon, Spivak, McClelland, Maier & Neustadt, P.C.

(57) ABSTRACT

A mobile communications system is disclosed that includes a first local routing manager (LRM) providing a first network in which a mobile terminal is currently located, a second local routing manager (LRM) providing a second network in which a counterpart terminal communicating with the mobile terminal is currently located, and a home routing manager (HRM) managing correspondence between the unique home address of the counterpart terminal and the second network. The first LRM has a controller that acquires address information of the counterpart terminal from the second LRM, via the HRM, when the first LRM does not have the address information, and communication means that transmits the address information of the counterpart terminal to a router of a new cell in the first network when the mobile terminal moves into the new cell.

1 Claim, 9 Drawing Sheets

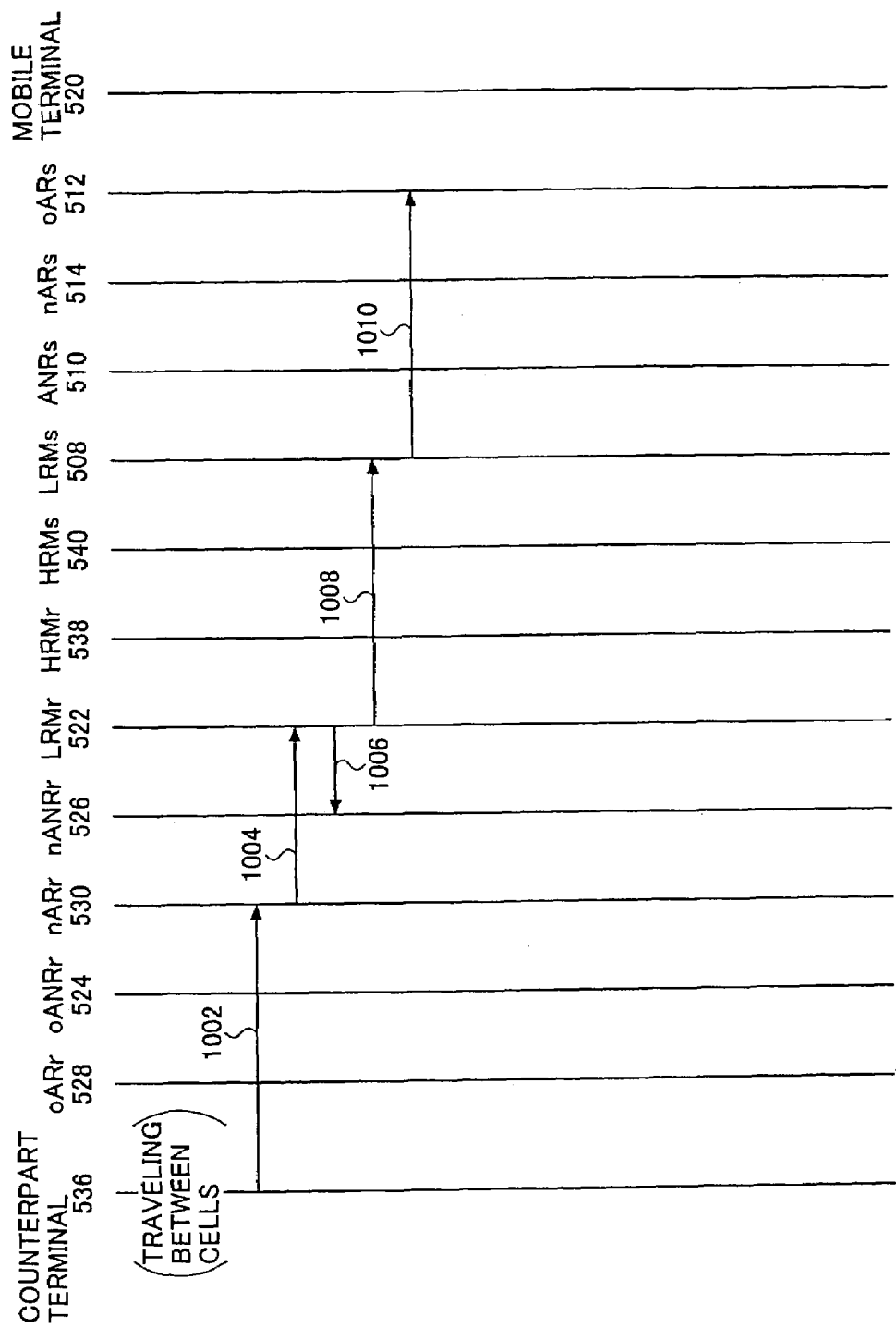

MOBILE COMMUNICATIONS SYSTEM AND ROUTING MANAGEMENT APPARATUS USED IN THE MOBILE COMMUNICATIONS SYSTEM

BACKGROUND OF THE INVENTION

The present invention generally relates to a mobile communications technique, and more particularly to a mobile communications system that manages mobility of a mobile terminal in a network and to a routing manager used in the mobile communications system.

Various studies have been made on Internet Protocol (IP) based mobile communication networks.

FIG. 1 is an example of such an IP based mobile communications system. The system 100 includes a first network 102 managed by a telecommunication carrier to provide mobile telephone services, a second network 104 managed by the same or a different telecommunication carrier to provide mobile telephone services, and a third network 106, such as the Internet, connecting the first and second networks 102 and 104. Signal transmission of a mobile terminal in the first network 102 is managed by a first local routing manager (LRMs) 108. The lower case letter "s" denotes a sender, which in this case is the mobile terminal 120. The lower case letter "r" described below denotes a receiver, which in this example is a counterpart destination mobile terminal 136. It is needless to say that the mobile terminal 120 and the counterpart destination terminal 136 function as both senders and receivers during telecommunications.

In the first network 102, an anchor router (ANRs) 110 and access routers (ARs) 112 and 114 connected under the anchor router 110 are arranged. The access routers 112 and 114 have cells 116 and 118, respectively, which are prescribed geographic areas controlled by these access routers. The access routers 112 and 114 are capable of communicating with mobile terminals located in the associated cells. In the example shown in FIG. 1, the mobile terminal 120 is located in the cell 116 of the access router 112. ANRs 110 delivers or routes a received packet to access router 112 or 114 according to the routing management scheme of LRMs 108. The LRMs 108 manages a table of received packets (TRP) that describes how the address of the packet received at the ANRs 110 is to be converted for routing the packet. In general, there is one or more anchor routers in a network. When using multiple anchor routers, the network is divided into multiple sections, and packet routing efficiency is improved.

Similarly, signal transmission of a mobile terminal in the second network 104 is managed by a second local routing manager (LRMr) 122. In the second network 104, access router (oARr) 128 connected under anchor router (oANRr) 124, and access router (nARr) 130 connected under anchor router (nANRr) 126 are arranged. The lower case letters "o" and "n" denote old and new, respectively, which represent before and after handover between cells. The access routers 128 and 130 have cells 132 and 134, respectively, which are prescribed geographic areas controlled by these access routers. The access routers 128 and 130 are capable of communicating with mobile terminals located in the associated cells. In the example shown in FIG. 1, the counterpart terminal 136, which is in communication with the mobile terminal 120, is located in the cell 132 of the access router 128. Anchor routers 124 and 126 deliver or route a received packet to the associated access routers 128 and 130, according to the routing management scheme of LRMr 122. The LRMr 122 manages a table of received packets (TRP) that describes how the address of the packet received at each of the anchor routers is to be converted for routing the packet.

The mobile communications system 100 also includes home routing manager (HRMr) 138. Home routing manager (HRMr) 138 manages the correspondence between the unique IP home address "IPhar" of the counterpart terminal 136 and the address "ANRr.x" used in the network in which the counterpart terminal 136 is currently located as a visitor. Home address "IPha" is an unchanging IP address assigned to each terminal, regardless of which network the terminal is currently visiting. In the network, an IP routing address "IPra", such as "AR.x", is also used. This IP routing address is a temporary address assigned by the associated access router to the terminal located in the cell. The mobile communications system 100 further includes home routing manager (HRMs) 140, which manages the correspondence between the unique IP home address "IPhas" of the mobile terminal 120 and the local address "ANRs.x" used in the network in which the mobile terminal 120 currently exists.

FIG. 2 is sequence diagram showing a sequence carried out when telecommunication is started between the mobile terminal 120 and the counterpart destination terminal 136 in the mobile communications system 100 shown in FIG. 1. First, as indicated by step 202, the mobile terminal 120 transmits a data packet addressed to the counterpart terminal 136, designated by the home address "IPhar", to the access router 112 to which the mobile terminal currently belongs. The access router 112 refers to the table of sending packets (TSP) to determine to which access router or anchor router the packet with address "IPhar" is to be transferred. If the table of sending packets defines the address for accessing the counterpart destination terminal 136, then the access router 112 converts the address held in the data packet to the new address described in the table of sending packets in order to route the packet.

If there is no information about the counterpart destination terminal 136 in the table of sending packets, then the access router 112 queries the home routing manager (HRMr) 138, which manages the IP home address "IPhar" of the counterpart terminal 136, about the information of the counterpart destination terminal 136, as indicated in step 204. Then, in step 206, the access router 112 acquires the address required to access the counterpart terminal 136. Since in the example shown in FIG. 1 the counterpart destination terminal 136 is located in cell 132 controlled by access router 128 under the anchor router 124, the home routing manager HRMr 138 manages the home address "IPhar" in association with address "oANRr.x" given under the anchor router 124. The latter address is reported to the access router 112. Upon receiving the current local address, the access router 112 creates a new entry in the table of sending packets so as to convert the home address "IPhar" of the counterpart terminal 136 into address "oANRr.x" assigned under anchor router 124.

In FIG. 2, double arrows (such as step 202) represent a signal transmission containing a data packet transmitted between the mobile terminal 120 and the counterpart terminal 136. The single arrows (such as step 204) represent transmission of control signals that do not contain substantial data packets.

Hereinafter, address "IPhar" of the data packet having arrived at the access router 112 is converted to address "oANRr.x", and the address-converted packet is transmitted in the network, as in step 208.

Then, in step 210, the anchor router 124 converts the address "oANRr.x" of the received packet to "oARr.x", based on the table of received packets (TRP), and transmits the address-converted packet to the access router 128 arranged under this anchor router 124. The contents of the table of received packets (that is, converting "oANRr.x" to "oARr.x") are defined by LRMr 122 that manages the locations and the mobility of the cellular terminals existing in the network 104. The access router 128 gives the address "oARr.x" to the counterpart terminal 136 for telecommunications when the counterpart terminal 136 has entered the cell 132, and records the correspondence between the local address and the home address of the counterpart terminal 136 (indicating address conversion from "oARr.x" to "IPhar") in the table of received packets (TRP).

Accordingly, upon receiving the data packet addressed to "oARr.x", the access router 128 converts this address to "IPhar" according to the table TRP, and transmits the address-converted packet to the counterpart destination terminal 136, as in step 212. In this manner, the data packet transmitted from the mobile terminal 120 is correctly delivered to the counterpart destination terminal 136.

Next, when the counterpart terminal 136 responds to the mobile terminal 120, the access router 128 receives a data packet addressed to the home address "IPhas" of the mobile terminal 120 in step 214. The subsequent procedures are the same as those in steps 202 through 212. The access router 128 checks the table of sending packets in order to convert the home address "IPhas" of the mobile terminal 120 to the appropriate address. If there is information about the address conversion defined in the transmission table TSP, the home address of the data packet is converted to the local address indicated by the transmission table TSP for further transmission.

If there is no information about address conversion of the mobile terminal 120 in the transmission table TSP, then the access router 128 requests information about the mobile terminal 120 from the home routing manager (HRMs) 140, which manages the IP home address "IPhas" of the mobile terminal 120, as indicated in step 216. Then, the access router 128 acquires address "ANRs.x", which is given under the anchor router 110 and managed in association with home address "IPhas". The access router 128 creates a new entry in the table of sending packets TSP so as to convert the home address "IPhas" of the mobile terminal 120 into address "ANRs.x" assigned under anchor router 110.

Hereinafter, address "IPhas" of the data packet having arrived at the access router 128 is converted to address "ANRs.x", and the address-converted packet is transmitted in the network, as in step 220.

Then, in step 222, the anchor router 110 converts the address "ANRs.x" of the received packet to "oARs.x", based on the table of received packets (TRP), and transmits the address-converted packet to the access router 112 arranged under this anchor router 110. The contents of the table of received packets (that is, converting "ANRs.x" to "oARs.x") are defined by LRMs 108 that manages the locations and the mobility of the cellular terminals existing in the network 102. The access router 112 gives the address "oARs.x" to the mobile terminal 120 when the mobile terminal 120 has entered the cell 116 for telecommunication, and records the correspondence between the local address and the home address of the mobile terminal 120 (indicating address conversion from "oARs.x" to "IPhas") in the table of received packets (TRP).

Accordingly, upon receiving the data packet addressed to "oARs.x", the access router 112 converts this address to "IPhas" according to the table TRP, and transmits the address-converted packet to the mobile terminal 120 located in the cell 116, as in step 224. In this manner, the data packet transmitted from the counterpart terminal 136 is correctly delivered to the mobile terminal 120.

Since when a data packet is relayed at each node, address conversion is conducted, rather than encapsulation, overhead can be prevented from increasing. Accordingly, packet transmission can be performed efficiently. In addition, in telecommunication between the mobile terminal and the counterpart terminal, only each other's home addresses are used, and the routing address (for example, "ARr.x", "oARs.x", etc.) containing the location information of the cellular terminal is concealed in the network. Consequently, privacy of the user is protected. Concerning the above-described type of mobile communications system, see "Mobility Management Architecture for IP-based IMT Network Platform", M. Sawada, et al., IEICE Society Conference, September 2002.

FIG. 3 shows the communications sequence during handover of the mobile terminal 120 between cells, which could happen after the sequence shown in FIG. 2. In this example, the mobile terminal 120 currently located in cell 116 and in communication with the counterpart terminal 136, is moving to another cell.

To allow the handover of the mobile terminal 120, the tables of received packets stored in the anchor router 110 and a new access router 114 have to be updated so as to forward incoming packets addressed to the mobile terminal 120 to the new access router 114. The table of received packets of the access router 114 may be updated when the access router 114 assigns address "nARs.x" to the mobile terminal 120. The table of received packets of the anchor router 110 is updated based on the notification transmitted from the new access router 114 to the LRMs 108 in step 301. The LRMs 108 instructs anchor router 110 to update the table of received packets in step 303.

In addition to updating the table of received packets, the access router 114 has to create a new entry in the table of sending packets TSP. As indicated in step 305, when receiving data packets addressed to home address "IPhar" of the counterpart terminal 136 from the mobile terminal 120, the access router 114 searches in the table of sending packets. However, it is currently unknown to which address the home address "IPhar" of the counterpart terminal 136 be converted because there is no past record of sending packets from this access router 114 to the counterpart terminal 136.

Accordingly, in step 304, the access router requests the information about the counterpart terminal 136 from the home routing manager HRMr 138 that manages the home address "IPhar" of the counterpart terminal 136, if the table of sending packets does not have the information. Then, the access router 114 acquires information about the local address currently used by the counterpart terminal 136 in step 306. Based on the information, the access router 114 creates a new entry representing address conversion of the home address "IPhar" of the counterpart terminal 136 into "oANRr.x" assigned under the anchor router 124.

When the new entry is recorded in the table of sending packets, the data packets addressed to the counterpart terminal 136, which have been buffered in the access router 114, are transmitted to the anchor router 124, as in step 308. Then, the data packets are forwarded to the counterpart terminal 136 in steps 310 and 312.

However, this method has a problem because HRMe 138 is generally far away from network 102, and therefore, the requesting and responding (steps 304 and 306) between the access router 114 and HRMr 138 are likely to take a long time. This results in undesirable delay in creating a new entry in the table of sending packets at the new access router.

Unless the new entry is recorded in the table of sending packets, the data packets buffered in the access router cannot be transmitted. This makes it difficult to carry out handover, while transmitting data packets continuously. Especially, since the requesting sequence from the access router 114 (such as steps 304 and 306) is started after the receipt of data packets transmitted from the mobile terminal 120 to the counterpart terminal 136, the data packets are buffered in the access router 114 until the requesting sequence is completed and the table of sending packets is updated. It is a concern that the buffering delay becomes undesirably long. In addition, as the time required to update the table of sending packets becomes greater, the volume of data packets buffered in the access router 114 becomes large, and therefore, a large-capacity memory is required.

FIG. 4 shows a communications sequence during handover of the counterpart terminal 136 between cells, which could also happen after the sequence shown in FIG. 2. In this example, the counterpart terminal 136 is moving from cell 132 to another cell 134. If the handover is conducted between access routers under the same anchor router 124, the tables of received packets of the new access router 130 and the anchor router 124 can be updated using the same procedure as shown in steps 301 through 306. In this case, the same problem as has been described in connection with FIG. 3 occurs.

The handover sequence illustrated in FIG. 4 is one conducted between access routers under different anchor routers. In step 402, the counterpart terminal 136 accesses the new access router 130. The access router 130 creates a new entry in the table of received packets so as to associate the local address "nARr.x" assigned by the access router 130 with home address "IPhar" of the counterpart terminal 136.

Then, in step 404, the access router 130 requests LRMr 122 to update the table of received packets stored in the new anchor router 126. In response to the request, LRMr 122 and the new anchor router 126 update the tables of received packets so that address "nANRr.x" is associated with address "nARr.x" assigned by the access router 130, as in step 406.

Then, in step 408, LRMr 122 requests HRMr 138 to update the record so as to associate the home address "IPhar" of the counterpart terminal 136 with address "nAN-Rr.x" assigned under the new anchor router 126.

Then, in step 410, the HRMr 138 reports the updated correspondence between the home address "IPhar" of the counterpart terminal 136 and the new local address "nAN-Rr.x" assigned under the anchor router 126 to the access routers and other nodes that have queried HRMr 138 about the counterpart terminal 136 in the past. In this particular example, the access router 112 has queried HRMr 138 in steps 204 and 206 in FIG. 2, and HRMr 138 stores this record. Upon receiving the report from HRMr 138, the access router 112 updates the table of sending packets so as to convert the home address "IPhar" of the counterpart terminal 136 into "nANRr.x". In the subsequent process, the packets addressed to the counterpart terminal 136 are correctly delivered to the counterpart terminal 136 located in the new cell.

However, because the table of sending packets of the access router (step 410) is updated via HRMr 138, which in general is located far away from the first and second networks 102 and 104, time required to update the table of sending packets may be undesirably increased. Unless the table of sending packets of the access router 112 is promptly updated, a number of data packets may be transmitted to the previous anchor router 124 having functioned before the handover, depending on case. This may result in decreased transmission efficiency.

SUMMARY OF THE INVENTION

Therefore, it is an object of the present invention to overcome the above-described problems in the conventional art, and to provide a packet routing management technique used in a mobile communications system that allows the address conversion table used to convert the address of a packet to be updated promptly at each node, whenever handover occurs at a mobile terminal.

It is another object of the invention to provide a packet routing management technique used in a mobile communications system that allows prompt update of the address conversion table at each node whenever handover occurs at a counterpart mobile terminal.

To achieve the objects, in one aspect of the invention, a mobile communications system is provided. This mobile communications system includes:

a first local routing management apparatus (LRMs) that provides a first network and manages signal routing in the first network in which a mobile terminal is currently located;

a second local routing management apparatus (LRMr) that provides a second network and manages signal routing in the second network in which a counterpart terminal communicating with the mobile terminal is currently located; and a home routing management apparatus (HRMr) that manages correspondence between a unique home address of the counterpart terminal and the second network, wherein the first local routing management apparatus comprises:

(a) a controller that acquires address information about the counterpart terminal from the second local routing management apparatus, via the home routing management apparatus, when the first local routing management apparatus does not have the address information; and (b) communication means that transmits the address information about the counterpart terminal to a first router of a new cell in the first network when the mobile terminal moves into the new cell.

In another aspect of the invention, a local routing management apparatus, which provides a first network and manages signal routing for a mobile terminal currently existing in the first network and communicating with a counterpart terminal located in a second network, is provided. The local routing management apparatus comprises:

a controller that acquires address information about the counterpart terminal from a second local routing management apparatus of the second network, via a home routing manager that managers correspondence between a unique home address of the counterpart terminal and the second network, when the local routing management apparatus does not have the address information; and communication means that receives an inquiry about the address information of the counterpart terminal from a router of a new cell in the first network when the mobile terminal moves into the new cell, and transmits the address information about the counterpart terminal to the router in response to the inquiry.

In still another aspect of the invention, a local routing management apparatus providing a second network and managing signal routing for a counterpart terminal currently existing in the second network and communicating with a mobile terminal visiting in a first network is provided. The local routing management apparatus comprises:

a controller that updates address information about the counterpart terminal in response to a request from a router of a new cell in the second network when the counterpart terminal moves into the new cell;

communication means that reports the updated address information of the counterpart terminal directly to the first network, without passing through a home routing management apparatus that manages correspondence between a home address of the counterpart terminal and the second network; and a storage that stores an address required to access the first network.

In yet another aspect of the invention, a home routing management apparatus used in a mobile communications system including a first local routing management apparatus providing a first network and managing signal routing in the first network, and a second local routing management apparatus providing a second network and managing signal routing in the second network, is provided. The home routing management apparatus comprises:

a controller that manages correspondence between a home address of a counterpart terminal and the second network in which the counterpart terminal currently exists, and acquires address information about the counterpart terminal from the second network upon receiving an inquiry from the first local routing management apparatus;

a storage that stores an address required to access the first local routing management apparatus; and communication means that transmits the address information of the counterpart terminal to the first local routing apparatus in response to the inquiry.

BRIEF DESCRIPTION OF THE DRAWINGS

Other objects, features, and advantages of the invention will become more apparent from the following detailed description when read in conjunction with the accompanying drawings, in which

FIG. 10 is a sequence diagram carried out during handover of the counterpart terminal in the mobile communications system shown in FIG. 5 according to an embodiment of the invention.

DETAILED DESCRIPTION OF THE INVENTION

The present invention is described in detail below in conjunction with FIG. 5 through FIG. 10.

Figure 5:
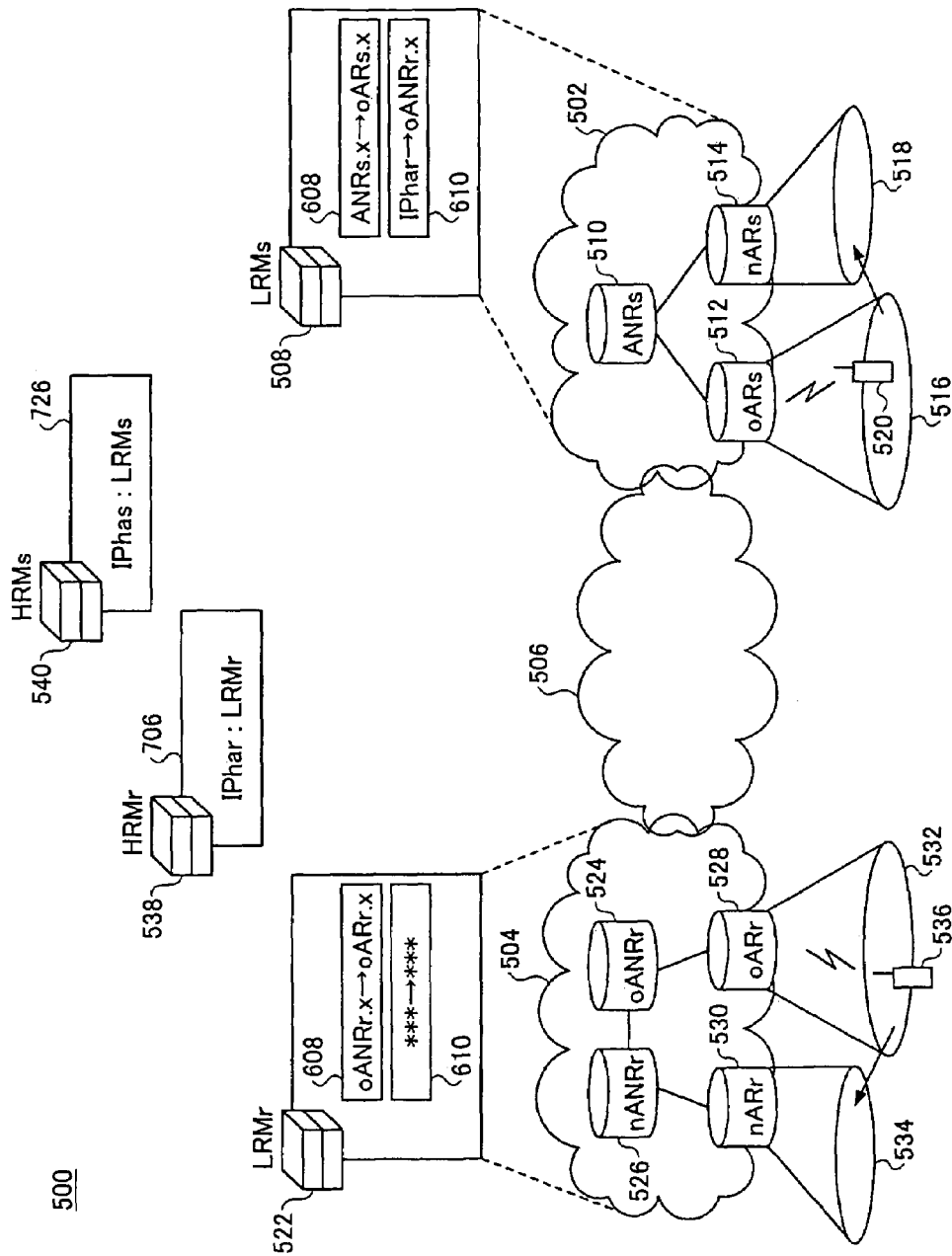
FIG. 5 is a schematic diagram showing the overall structure of a mobile communications system according to an embodiment of the invention.

FIG. 5 schematically illustrates the overall structure of a mobile communications system according to an embodiment of the invention. The mobile communications system 500 includes a first network 502 that provides mobile telephone services managed by a telecommunication carrier, a second network 504 that provides mobile telephone services managed by the same or a different telecommunication carrier, and a third network 506, such as the Internet, connecting the first and second networks 502 and 504. Signal transmission of a mobile terminal in the first network 502 is managed by a first local routing manager (LRMs) 508.

In the first network 502, an anchor router (ANRs) 510 and access routers (ARs) 512 and 514 connected under the anchor router 510 are arranged. The access routers 512 and 514 have cells 516 and 518, respectively, and they are capable of communicating with mobile terminals located in the associated cells. In the example shown in FIG. 5, the mobile terminal 520 is located in the cell 516 of the access router 512. The ANRs 510 delivers or routes a received packet to access router 512 or 514 according to the routing management scheme of LRMs 508. The LRMs 508 manages a table of received packets (TRP) that describes how the address of the packet received at the ANRs 510 is to be converted for routing the packet. In the embodiment, the LRMs 508 manages not only the table of received packets, but also information about the tables of sending packets of the access routers 512 and 514, which differs from the conventional local routing manager LRM.

Similarly, signal transmission of a mobile terminal in the second network 504 is managed by a second local routing manager (LRMr) 522. In the second network 504, access router (oARr) 528 connected under anchor router (oANRr) 524, and access router (nARr) 530 connected under anchor router (nANRr) 526 are arranged. The access routers 528 and 530 have cells 532 and 534, respectively, and they are capable of communicating with a mobile terminal located in the associated cells. In the example shown in FIG. 5, the counterpart mobile terminal 536 which is in communication with the mobile terminal 520 is located in the cell 532 of the access router 528. Anchor routers 524 and 526 deliver or route a received packet to the associated access routers 528 and 530, according to the routing management scheme of LRMr 522. Similar to the LRMs 508, the LRMr 522 manages not only a table of received packets (TRP) that describes how the address of the packet received at this anchor router is to be converted for packet routing, but also the tables of sending packets (TSP) of the access routers arranged under this anchor router.

The mobile communications system 500 also includes home routing manager (HRMr) 538, which manages the correspondence between the unique IP home address "IPhar" of the counterpart terminal 536 and the local routing manager (LRMr) 522 that manages the network in which the counterpart mobile terminal 536 is currently located as a visitor. This arrangement is different from the conventional HRMr 138 that manages the correspondence between the home address "IPhar" of the counterpart terminal and the address information "oANRr.x" used in the network which the counterpart terminal is currently visiting. The mobile communications system 500 further includes home routing manager (HRMs) 540, which manages the correspondence between the unique IP home address "IPhas" of the mobile terminal 520 and the local routing manager LRMs 508 that manages the network which the mobile terminal 520 is currently visiting.

Figure 6:
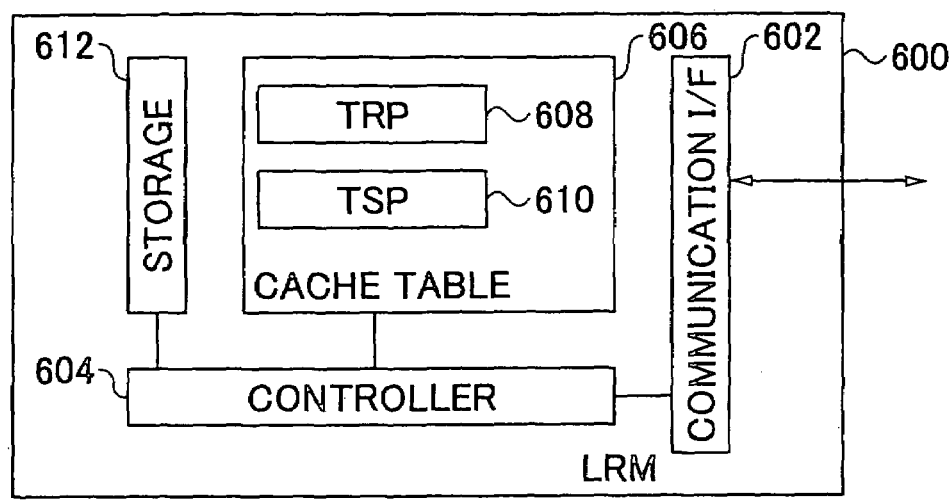
FIG. 6 is a block diagram of a local routing manager (LRM) used in the mobile communications system shown in FIG. 5.

FIG. 6 is a block diagram of the local routing manager (LRM) applicable to the mobile communications system 500 according to the embodiment. The diagram of FIG. 6 shows the major elements of a LRM 600. The functions of the local routing manager (LRM) 600 are in common between the first and second LRMs 508 and 522 shown in FIG. 5; however, they are managing different terminals. The LRM 600 has a communication interface 602, which interfaces communication with other nodes in the mobile communications system. Examples of such nodes include access routers (AR), anchor routers (ANR), home routing managers (HRM), and other local routing managers (LRM). The LRM 600 has a controller 604 that controls the entire operation of the components of the LRM 600, and a cache table 606 including a table of received packets (TRP) 608 and a table of sending packets (TSP) 610. The LRM 600 also has a storage 612 that stores information about those access routers that have queried the LRM 600 in the past, as well as address information required to access other nodes, such as other local routing managers.

The contents of the table of received packet 608 controlled by the controller 604 include information indicating that, for example, packets addressed to the mobile terminal 520 currently located under the anchor router 510 are to be forwarded to the access router 512. To be more precise, the table of received packets 608 defines an address conversion table defining how the address of a packet received at the anchor router 510 is to be converted. The cache table 606 also includes a table of sending packets 610, which has contents similar to the table of sending packets of the access router 512.

Figure 7:
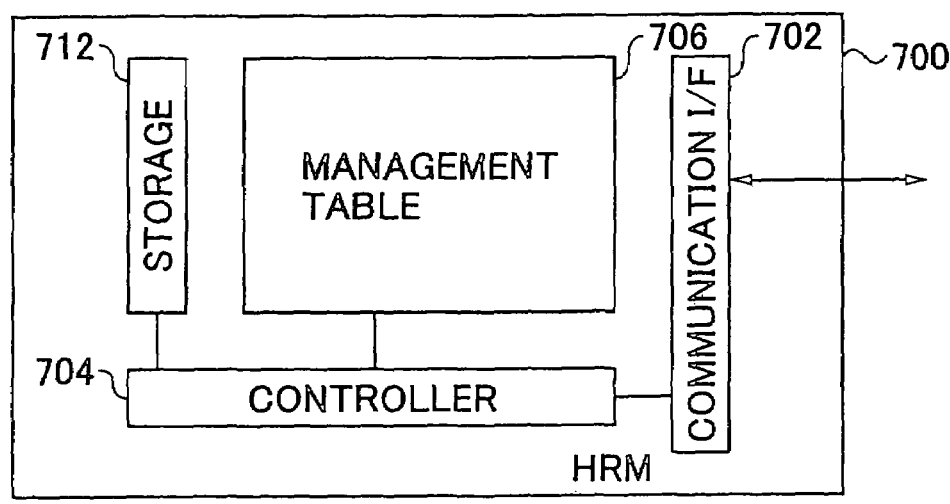
FIG. 7 is a block diagram of a home routing manager (HRM) used in the mobile communications system shown in FIG. 5.

FIG. 7 is a block diagram of the home routing manager (HRM) 700 applicable to the mobile communications system 500 according to the embodiment. The diagram of FIG. 7 shows the major elements of the HRM 700. The functions of the home routing manager (HRM) 700 are in common between the HRMr 538 and HRMs 540 shown in FIG. 5; however, they manage different mobile terminals. The HRM 700 has a communication interface 702, which interfaces communication with another node, such as an LRM, in the mobile communications system 500. The HRM 700 has a controller 704 that controls the entire operation of the components of the HRM 700, and a management table 706. The HRM 700 also has a storage 712 that stores address information required to access other nodes, such as LRMs, that have queried the HRM 700 in the past.

The contents of the management table 706 include correspondence between a unique home address of each terminal (such as the mobile terminal 520 or the counterpart terminal 526) and the LRM that manages the network which the terminal with the home address is currently visiting. If HRM 700 is HRMr 538 shown in FIG. 5, the management table 706 manages the correspondence between the unique home address "IPhar" of the counterpart terminal 536 and the LRMr 522 than manages the network 504 which the counterpart terminal 536 is currently visiting.

Figure 8:
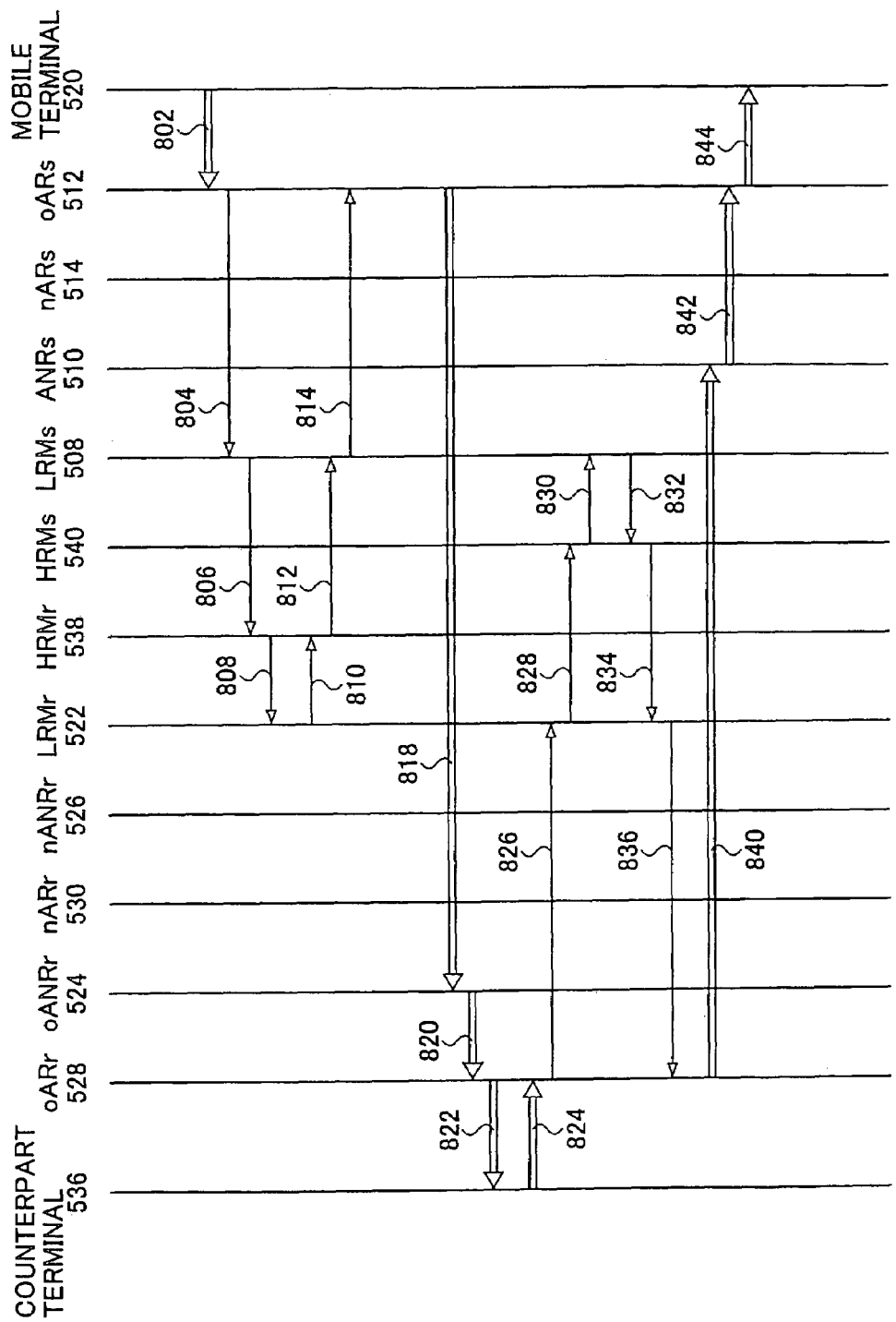
FIG. 8 is a sequence diagram of communications carried out in the mobile communications system shown in FIG. 5 according to an embodiment of the invention.

FIG. 8 is a sequence diagram showing the operations carried out in the mobile communications system 500 shown in FIG. 5. First, in step 802, to start telecommunication with the counterpart terminal 536, the mobile terminal 520 transmits a data packet addressed to the counterpart terminal 536, designated by the home address "IPhar", to the access router 512 to which the mobile terminal 520 currently belongs. The access router 512 searches the table of sending packets (TSP) to determine to which address the home address "IPhar" of the counterpart terminal 536 is to be converted. If the table of sending packets defines the address of the access router or another node for accessing the counterpart terminal 536, then the access router 512 converts the home address held in the data packet to the new address described in the table of sending packets to route the packet.

In step 804, if there is no information about the counterpart destination terminal 536 in the table of sending packets, then the access router 512 queries the local routing manager (LRMs) 508, which manages the first network 502, about the information of the counterpart destination terminal 536. If the LRMs 508 has the requested information, that information is immediately returned to the access router 512.

In FIG. 8, double arrows (such as step 802) represent signal transmissions containing a data packet transmitted between the mobile terminal 520 and the counterpart terminal 536. The single arrows (such as step 804) represent transmission of control signals that do not contain substantial data packets.

If the LRMs 508 does not have information about the counterpart destination terminal 536, the LRMs 508 inquires about the information by querying the HRMr 538 that manages the home address "IPhar" of the counterpart terminal 536, as indicated in step 806. At this time, the address required to respond to the access router 512 is stored in the storage 612 under the control of the controller 604. The information about the counterpart terminal 536 is relevant to the table of sending packets (TSP) of the access router 512, which is also related to the table of sending packets TSP of the LRMs 508. The operations of searching for the information about the counterpart terminal 536 in the table of sending packets 610, and providing or inquiring about information based on the search results, are carried out under the control of the controller 604. Upon receiving the inquiry from the LRMs 508, the HRMr 538 refers to the management table 706 under the control of controller 704, and finds that the counterpart terminal 536 with the home address "IPhar" is currently visiting the network 504 managed by the LRMr 522.

Then, by further querying the LRMr 522 specified based on the correspondence defined in the management table of the HRMr 538 in step 808, address "oANRr.x" required to access the counterpart terminal 536 is found. This address is transmitted to the LRMs 508 via the HRMr 538 in steps 810 and 812. At this time, LRMr 522 stores in the storage 612 an address required to access the LRMs 508 that has transmitted the inquiry about the counterpart terminal 536. When receiving the address "oANRr.x" for accessing the counterpart terminal 536, the LRMs 508 writes this address "oANRr.x" in the table of sending packets 610 in association with the home address "IPhar" of the counterpart terminal 536.

Then, in step 814, the address "oANRr.x" for accessing the counterpart terminal 536 is transmitted to the access router 512, which originally inquired about the information. The access router 512 updates the table of sending packets, creating a new entry.

Then, in step 818, the subsequent packets incoming to the access router 512 are transmitted to the anchor router 524 according to the table of sending packets. The packets are further forwarded to the access router 528 arranged under the anchor router 524, and finally delivered to the counterpart terminal 536, as shown in steps 820 and 822.

Next, explanation is made of the procedure performed when the counterpart terminal 536 responds to the mobile terminal 520, which is the same as performed in steps 802 through 822. Namely, in step 824, the counterpart terminal 536 transmits a data packet addressed to the mobile terminal 520, designated by the home address "IPhas", to the access router 528 to which the counterpart terminal 536 currently belongs. The access router 528 searches in the table of sending packets (TSP) for the information corresponding to the home address "IPhas" of the mobile terminal 520. In this example, the TSP does not have the information associated with "IPhas".

Then, in step 826, if there is no information about the mobile terminal 520 in the table of sending packets, then the access router 528 queries the local routing manager (LRMr) 522, which manages the second network 504, about the information of the mobile terminal 520. If the LRMr 522 has the requested information, that information is immediately returned to the access router 528.

If the LRMr 522 does not have the information about mobile terminal 520, the LRMr 522 queries the HRMs 540, which manages the home address "IPhas" of the mobile terminal 520, about that information, as indicated in step 828. Upon receiving the inquiry from the LRMr 522, the HRMs 540 refers to the management table 706 under the control of controller 704, and finds that the mobile terminal 520 with the home address "IPhas" is currently visiting the network 502 managed by the LRMs 508.

Then, in step 830, by further querying the LRMs 508 specified based on the correspondence defined in the management table of the HRMs 540, address "ANRs.x" required to access the mobile terminal 520 is found. This address is transmitted to the LRMr 522 via the HRMs 540, as shown in steps 832 and 834. When receiving the address "ANRs.x" for accessing the mobile terminal 520, the LRMr 522 writes this address "ANRs.x" in the table of sending packets 610 in association with the home address "IPhas" of the mobile terminal 520.

Then, in step 836, the address "ANRs.x" for accessing the mobile terminal 520 is transmitted to the access router 528, which originally inquired about the information. The access router 528 updates the table of sending packets, creating a new entry.

Then, in step 840, the subsequent packets incoming to the access router 528 are transmitted to the anchor router 510 according to the table of sending packets. The packets are further forwarded to the access router 512 arranged under the anchor router 510, and finally delivered to the mobile terminal 520, as shown in steps 842 and 844.

Figure 9:
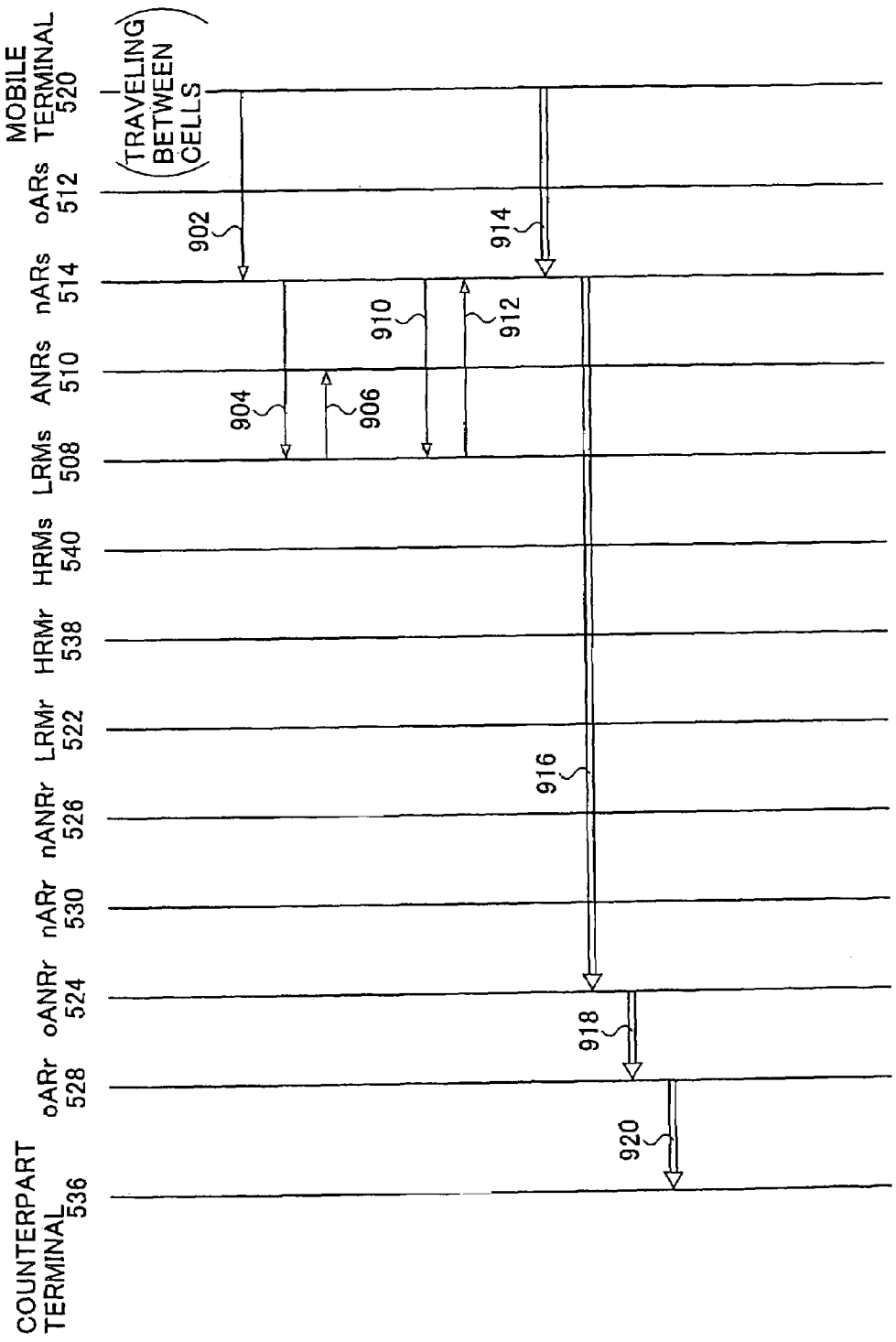
FIG. 9 is a sequence diagram carried out during handover of the mobile terminal in the mobile communications system shown in FIG. 5 according to an embodiment of the invention.

FIG. 9 illustrates the communication sequence performed during handover of the mobile terminal 520, which is moving from cell 516 to another cell 518, while being in communication with the counterpart terminal 536, in the mobile communications system 500 shown in FIG. 5.

To allow the handover of the mobile terminal 520, the tables of received packets stored in the anchor router 510 and a new access router 514 have to be updated so as to forward incoming packets addressed to the mobile terminal 520 to the new access router 514. The table of received packets of the access router 514 may be updated when the access router 514 assigns address "nARs.x" to the mobile terminal 520.

The table of received packets of the anchor router 510 can be updated when the access router 514 receives a signal from the mobile terminal 520 from the new cell 518, as indicated in step 902.

In step 904, in responding to the signal from the mobile terminal 520, the access router 514 reports the necessity of updating the table of received packet to the LRMs 508. Then, in step 906, the LRMs 508 instructs the anchor router 510 to update the table of received packet.

The new access router 514 has to create a new entry in the table of sending packets, in addition to updating the table of received packets.

In step 910, the access router 514 queries the LRMs 508, which manages the network 502 to which the access router 514 belongs, about information of the counterpart terminal 536. Since the LRMs 508 has already created the entry about the counterpart terminal 536 in step 812 shown in FIG. 8, the LRMs 508 has the address "oANRr.x" required to access the counterpart terminal 538.

Accordingly, the address "oANRr.x" is transmitted to the access router 514 that has made the inquiry in step 912. The access router creates a new entry in the table of sending packets so as to convert the home address "IPhar" of the counterpart terminal 536 to "oANRr.x".

Then, in step 914, data packets addressed to the counterpart terminal 536 are transmitted from the mobile terminal 520 to the access router 514. The data packets are forwarded to the counterpart terminal 536, via the anchor router 524 and the access router 528, as shown in steps 916, 918, and 920.

Figure 1:
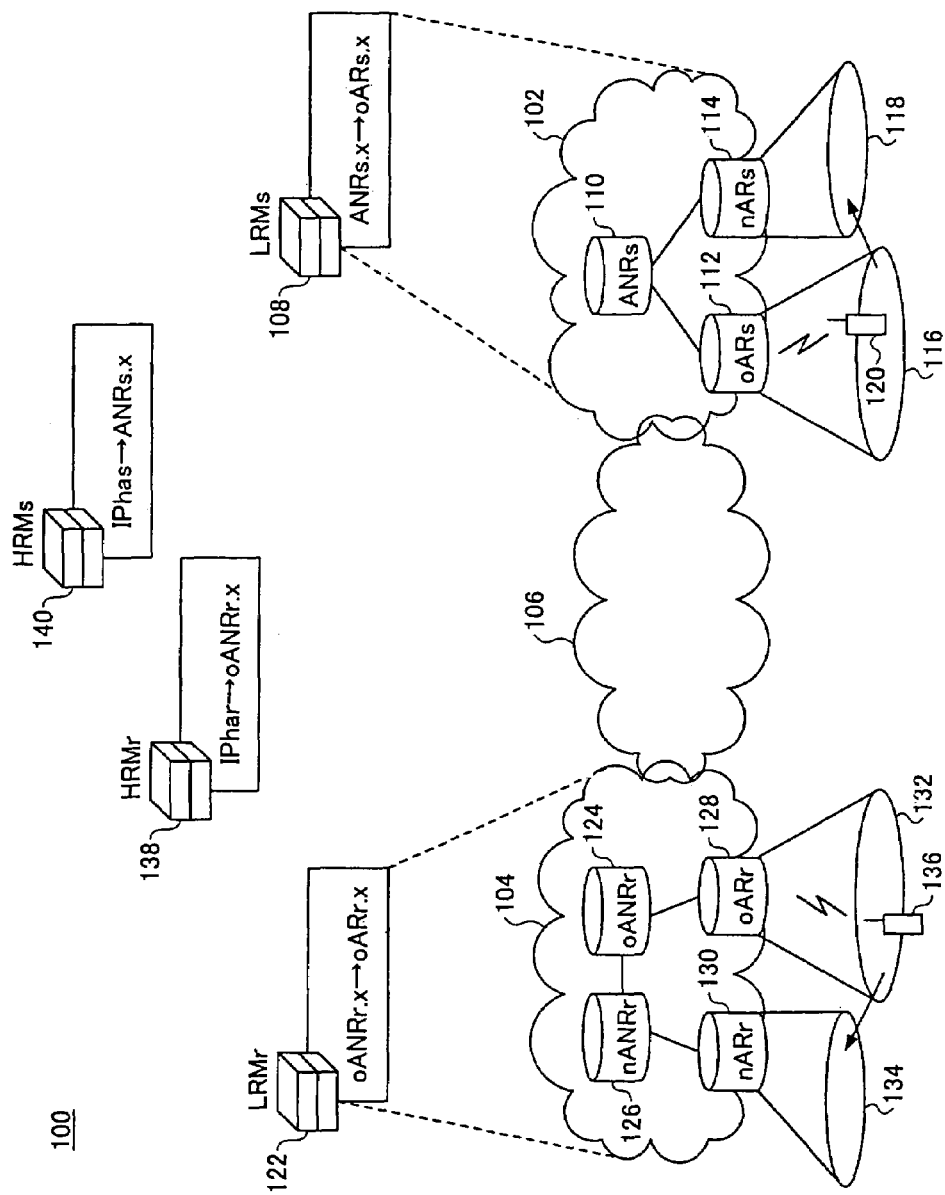
FIG. 1 is a schematic diagram showing the overall structure of a conventional mobile communications system.
Figure 2:
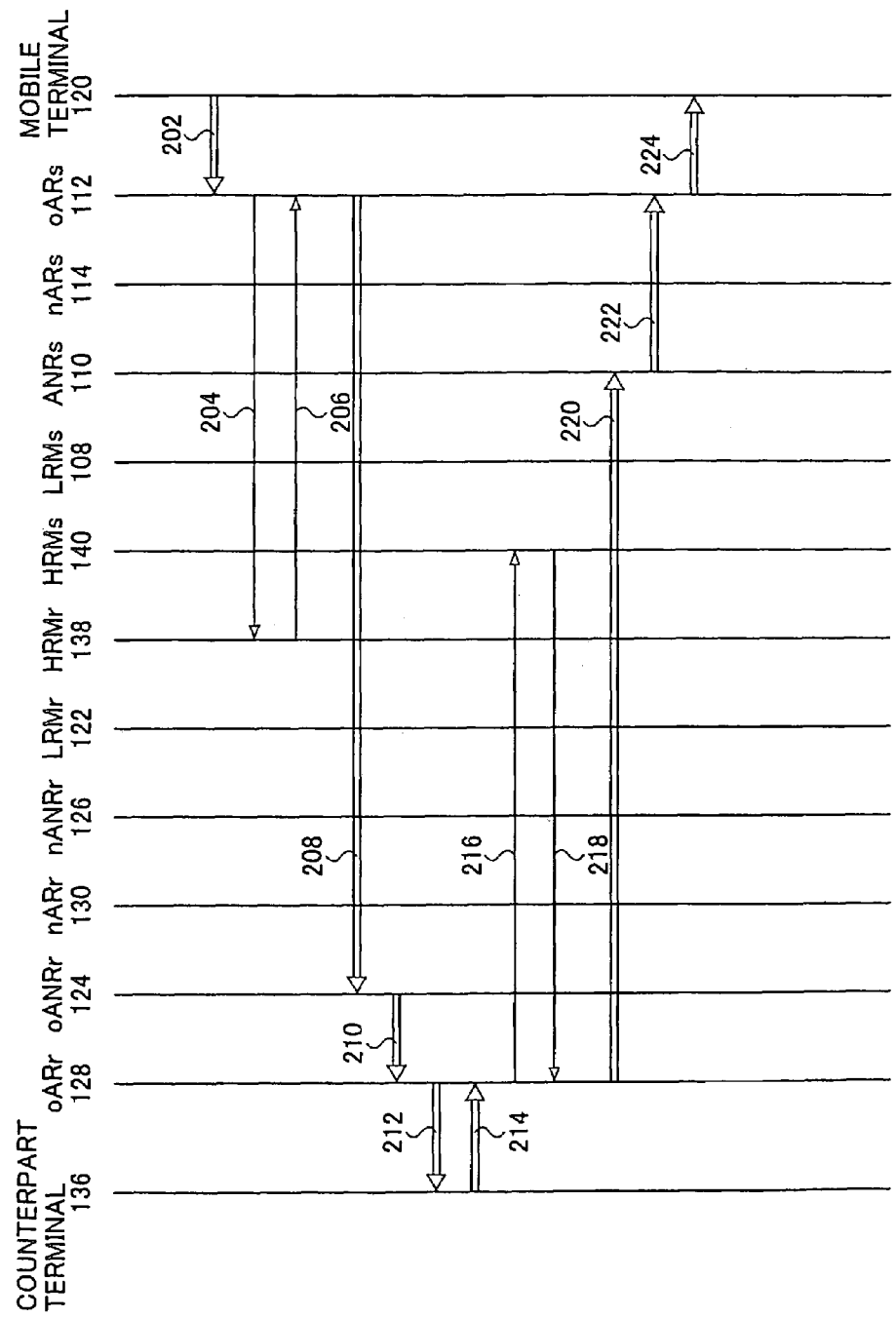
FIG. 2 is a sequence diagram of communications carried out in the mobile communications system shown in FIG. 1.
Figure 3:
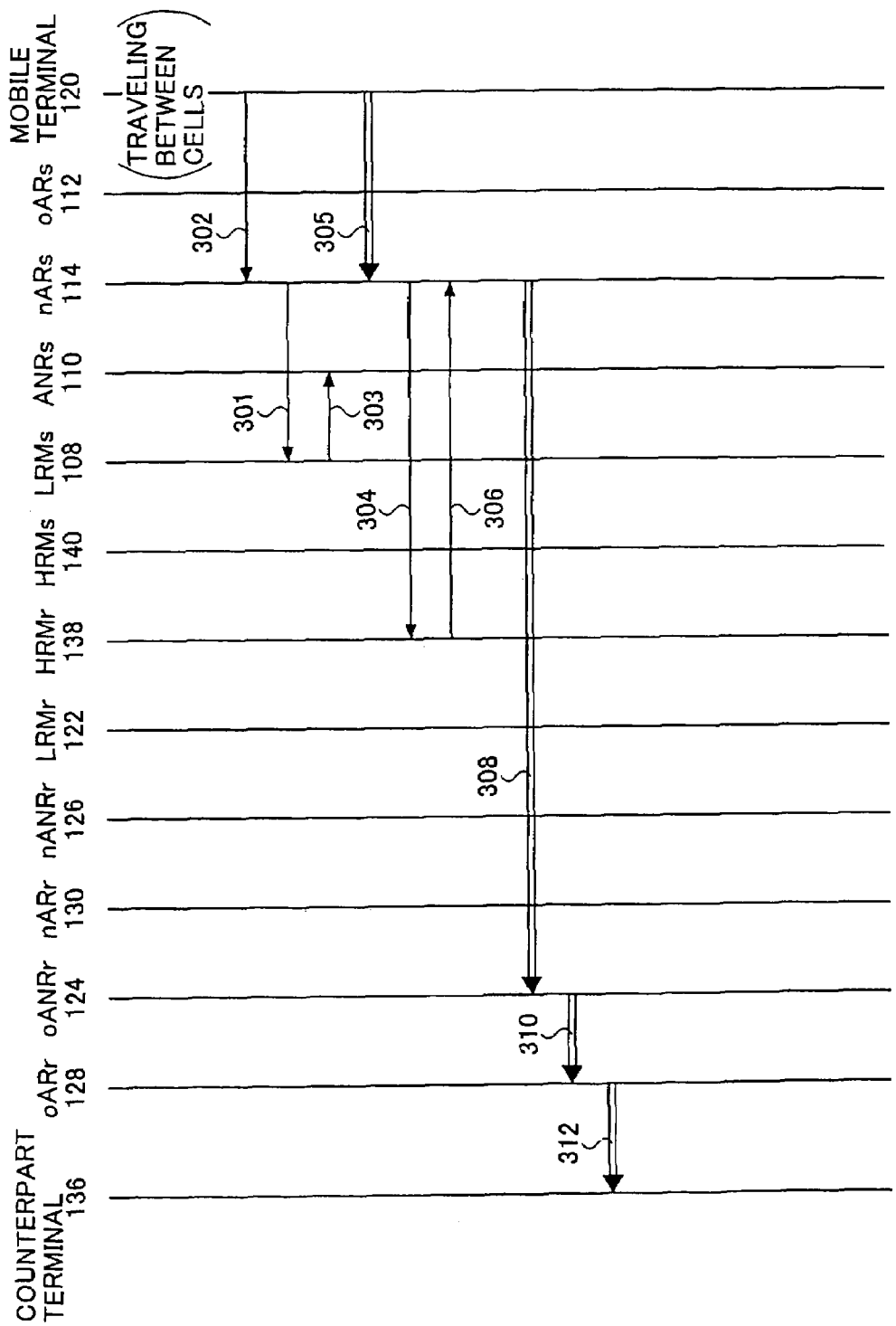
FIG. 3 is a sequence diagram carried out during handover of the mobile terminal in the mobile communications system shown in FIG. 1.

This process is efficient, as compared with the conventional method shown in FIG. 3. In the conventional method, when the mobile terminal has moved to a new cell, the new access router receives the packets from the mobile terminal, and buffers the packets while querying the HRMr about information of the counterpart terminal. After the information about the counterpart terminal is acquired by the access router, the buffered packets are transmitted to the counterpart terminal. This conventional technique takes a long time every time for handover to occur.

In contrast, with the method of this embodiment, the access router of the new cell has already acquired information about the counterpart terminal and prepared the table of sending packets before the data packets addressed to the counterpart terminal are transmitted from the mobile terminal to this new access router. Accordingly, the new access router can transmit the data packets immediately to the counterpart terminal upon receiving the data packets. Unlike HRMr 538, the LRMs 508 is capable of communicating with the nodes located in the first network 502 very quickly. During the handover of the mobile terminal 520, the new access router can promptly create a new entry in the table of sending packets by simply querying the LRMs 508 that manages the network 502, without communicating with the more distant HRMs 538 or other nodes. Since the table of sending packets containing the entry for the counterpart terminal is prepared before substantial data packets are transmitted from the mobile terminal, it is not necessary to buffer the data during the handover.

FIG. 10 shows a communication sequence during handover of the counterpart terminal 536 between cells, which could also happen after the sequence of FIG. 8 in the mobile communication system shown in FIG. 5. In this example, the counterpart terminal 536 is moving from cell 532 to another cell 534. If the handover is conducted between access routers controlled under the same anchor router 524, the tables of received packets of the new access router and the anchor router 524 can be updated using the same procedure as shown in FIG. 9, and explanation for it is omitted.

The handover sequence illustrated in FIG. 10 is one conducted between access routers under different anchor routers. In step 1002, the counterpart terminal 536 accesses the new access router 530. The access router 530 creates a new entry in the table of received packets so as to associate the local address "nARr.x" assigned by the access router 530 with home address "IPhar" of the counterpart terminal 536.

Then, in step 1004, the access router 530 requests LRMr 522 to update the table of received packets stored in the new anchor router 526. In response to the request, LRMr 522 and the new anchor router 526 update the tables of received packets so that address "nANRr.x" is associated with address "nARr.x" assigned by the access router 530, as in step 1006.

Then, in step 1008, LRMr 522 requests LRMs 508 to update the record so as to associate the home address "IPhar" of the counterpart terminal 536 with address "nANRr.x" assigned under the new anchor router 526. In this example, LRMs 508 has queried LRMr 522 about the counterpart terminal 536, and the LRMr 522 stores the record.

Then, in step 1010, the LRMs 508 reports the updated correspondence between the home address "IPhar" of the counterpart terminal 536 and the new local address "nANRr.x" assigned under the anchor router 526, to the access routers and other nodes that have queried LRMs 508 about the counterpart terminal 536 in the past. In this particular example, the access router 512 has queried LRMs 508 in step 804 of FIG. 8, and LRMs 508 has stored this record. Upon receiving the report from the LRMs 508, the access router 512 updates the table of sending packets so as to convert the home address "IPhar" of the counterpart terminal 536 into "nANRr.x". In the subsequent process, the packets addressed to the counterpart terminal 536 are correctly delivered to the counterpart terminal 536 located in the new cell 534.

Figure 4:
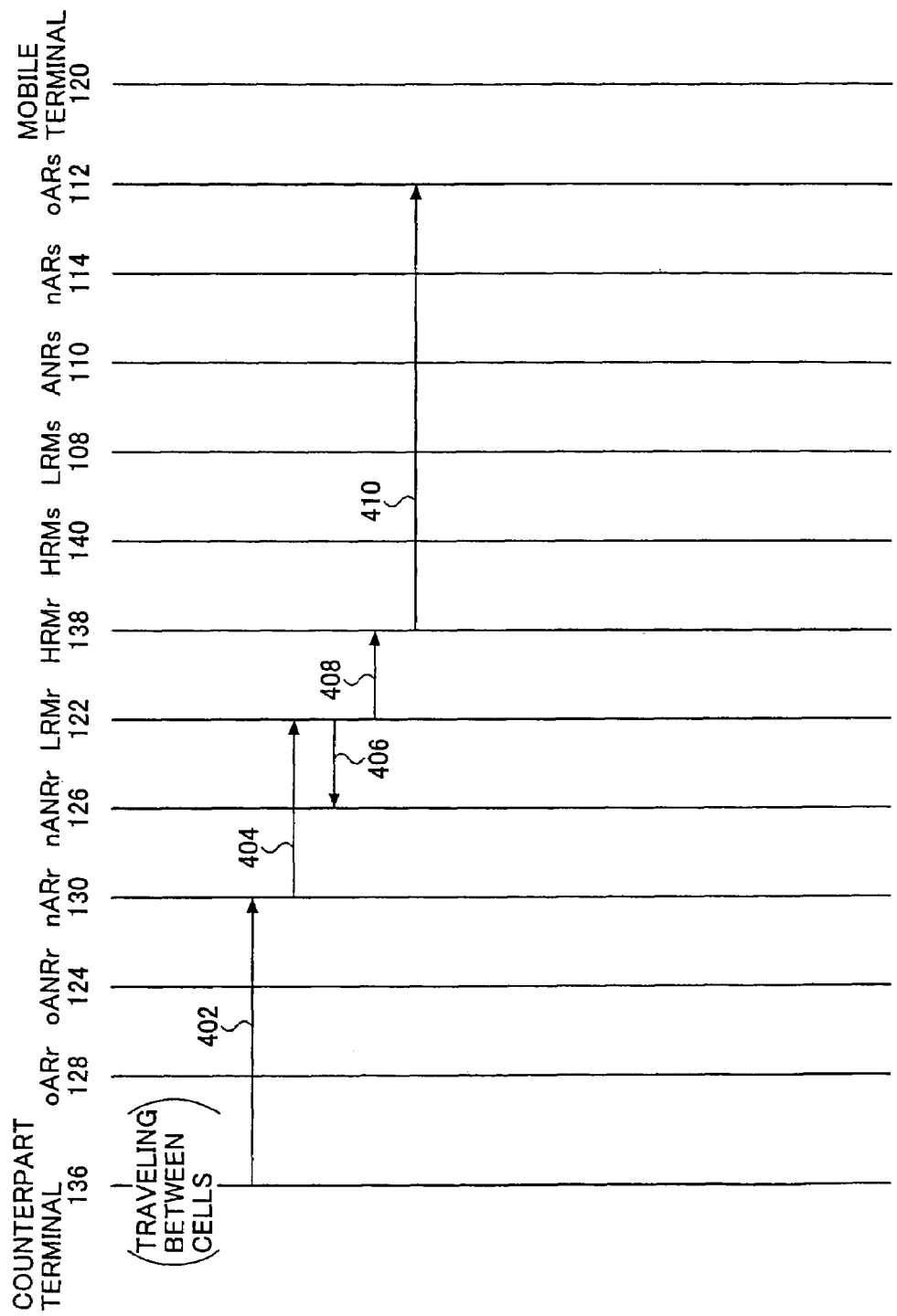
FIG. 4 is a sequence diagram carried out during handover of the counterpart terminal in the mobile communications system shown in FIG. 1.

In this manner, during the handover of the counterpart terminal 536, the table of sending packets can be updated promptly, without passing through a distant node, such as HRMr 538. This arrangement is advantageous, as compared with the conventional technique shown in FIG. 4.

In the above-described embodiment, prior to handover occurring at the mobile terminal or the counterpart terminal, the local router manger LRM already holds information required for a new access router to update the table of sending packets when the mobile station or the counterpart terminal is moving to the corresponding new cell. Such information is saved in the LRM prior to the handover, for example, when a link is established between the mobile terminal and the counterpart terminal. Since the local routing manager LRM locally manages the mobility of the terminals existing in its network, it is capable of communicating with a node in the network very quickly. The access router involved in handover can acquire necessary information by simply querying the local routing manager LRM that manages the network locally, and updating the table of sending packets promptly. As long as a cellular terminal moves between cells within the same network, any access router controlling a new cell queries the same LRM. Accordingly, it becomes unnecessary for the system to query a distant home routing manager HRM, thereby avoiding a slow response every time handover occurs.

In addition, the home routing manager HRM manages correspondence between a home address unique to a cellular terminal and a local routing manager LRM in which the cellular terminal currently exists. This arrangement differs from the conventional HRM that manages the correspondence between the home address of a cellular terminal and a local address required to access the cellular terminal. The address required to access the cellular terminal is a routing address to an anchor router, such as "ANRr.x" or "ANRs.x".

In general, required anchor routers vary depending on the positional relation between the mobile terminal and the counterpart terminal. A single mobile terminal A may communicate with multiple counterpart terminals via multiple anchor routers, depending on the case. In this case, the conventional HRM has to manage addresses of the multiple anchor routers for the mobile terminal A. In contrast, the home routing manager HRM according to the embodiment simply manages the correspondence between a home address and a LRM, regardless of the number of anchor routers arranged under this LRM. Consequently, the workload on the HRM can be reduced.

In conclusion, in the mobile communications system of the present invention, the address conversion table used to convert the routing address of a signal at each node can be updated and prepared promptly upon detecting handover at a mobile terminal or a counterpart terminal.

This patent application is based on and claims the benefit of the earlier filing date of Japanese Patent Application No. 2003-003485 filed Jan. 9, 2003, the entire contents of which are hereby incorporated by reference.

What is claimed is:

1. A mobile communications system including:
    a first local routing management apparatus that provides a first network and manages signal routing in the first network in which a mobile terminal is currently located;
    a second local routing management apparatus that provides a second network and manages signal routing in the second network in which a counterpart terminal communicating with the mobile terminal is currently located; and
    a home routing management apparatus that manages correspondence between a unique home address of the counterpart terminal and the second network, wherein the first local routing management apparatus comprises:
        communication means that communicates with a first router that carries out wireless communication with the mobile terminal;
        a controller that acquires address information required to access the counterpart terminal from the second local routing management apparatus, via the home routing management apparatus, when the first routing management apparatus does not have the address information; and
        a storage that stores an address required to access the first router; and wherein the second local routing management apparatus comprises:

a controller that updates the address information required to access the counterpart terminal when the counterpart terminal moves into a new cell controlled by a second router in the second network;

communication means that reports the updated address information about the counterpart terminal to the first local routing management apparatus so as to allow the first local routing management apparatus to instruct the first router to update previously supplied address information about the counterpart terminal; and a storage that stores an address required to access the first local routing management apparatus.

* * * * *